Feb. 1, 1938. A. W. HERRINGTON 2,107,072
MULTIAXLE DRIVE VEHICLE
Filed Dec. 5, 1936 3 Sheets-Sheet 2

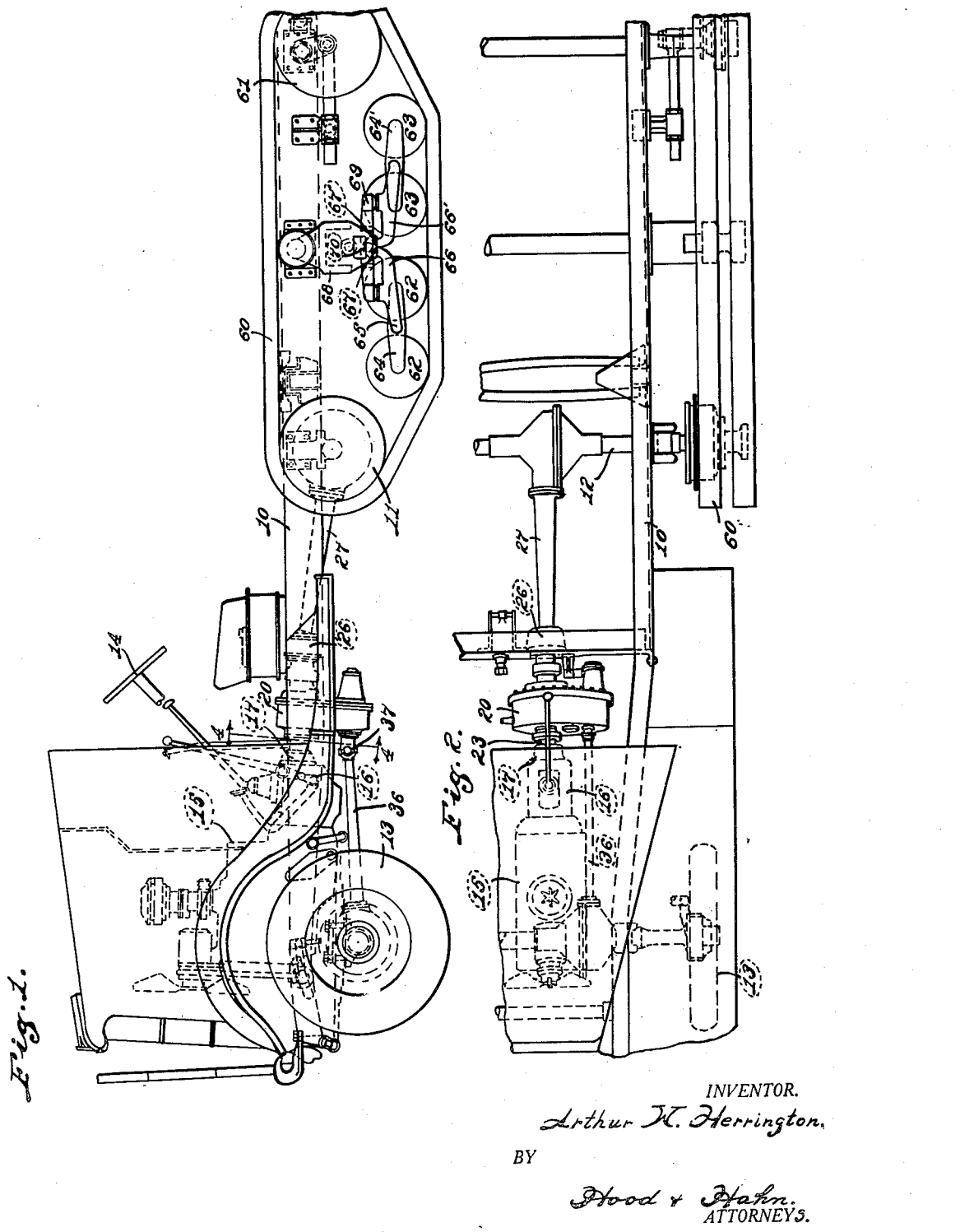

INVENTOR.
Arthur W. Herrington,
BY
Hood & Hahn.
ATTORNEYS.

Feb. 1, 1938.    A. W. HERRINGTON    2,107,072
MULTIAXLE DRIVE VEHICLE
Filed Dec. 5, 1936    3 Sheets-Sheet 3

INVENTOR.
Arthur W. Herrington,
BY
Hood & Hahn.
ATTORNEYS.

Patented Feb. 1, 1938

2,107,072

UNITED STATES PATENT OFFICE 2,107,072

MULTIAXLE DRIVE VEHICLE

Arthur W. Herrington, Indianapolis, Ind., assignor to Marmon-Herrington Company, Inc., Indianapolis, Ind., a corporation of Indiana Application December 5, 1936, Serial No. 114,371

2 Claims. (Cl. 74—342)

The usual motor vehicle comprises a chassis frame supported at its front and rear ends upon axles which are in turn supported by wheels journalled upon the outer ends of the axles, and the vehicle is guided by swinging each of the front wheels about a substantially vertical axis.

When such a vehicle is propelled through an arc-shaped path the front wheels always traverse longer paths than the rear wheels and each outer wheel of each pair traverses a longer path than its companion inner wheel. The last-mentioned differential is compensated, as to wheel pairs to which power is applied, by one of many well known forms of differential gearing and the first-mentioned differential, as to non-powered wheels, is of no consequence.

In vehicles where more than one pair of powered traction wheels are provided, however, as in four-wheel drive structures, the first-mentioned distance differential becomes a non-negligible factor which results in undue wear of the front wheel tires and an unnecessary consumption of power which cannot be compensated by the usual differential gears interposed between the power source and the transverse pairs of traction wheels.

The object of my invention is to provide mechanism by means of which delivery of power to the front power-driven wheel which will be automatically discontinued during arcuate travel and automatically resumed upon resumption of straight-line travel; together with manually manipulable means for temporarily rendering said automatic means non-effective, and, in one form, manually-manipulable means for temporarily disconnecting the front power-driven wheels from the motor.

The accompanying drawings illustrate my invention.

Figure 3:
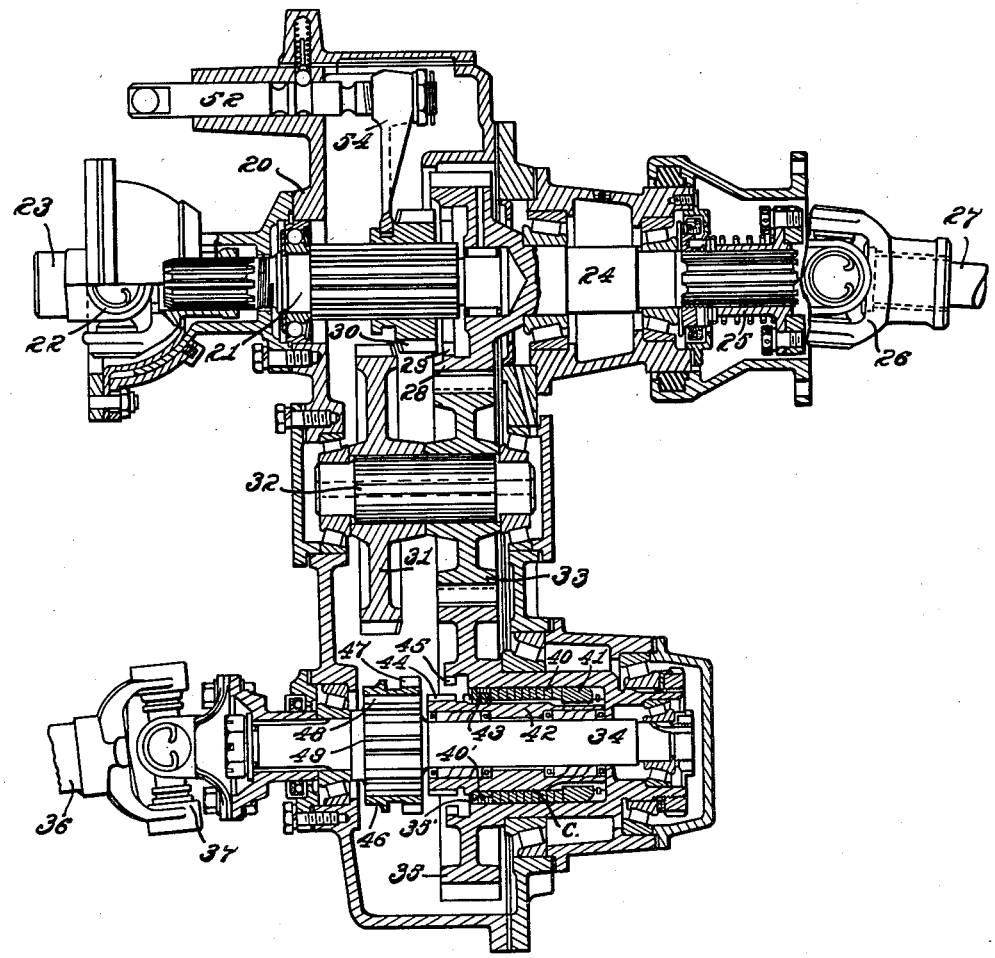
Figure 4:
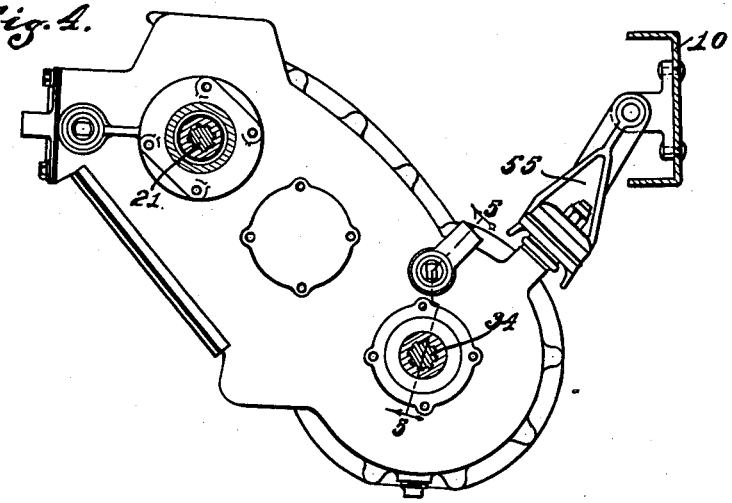

Fig. 1 is a diagrammatic elevation of a four-wheel drive vehicle embodying my invention;

Fig. 2 a diagrammatic plan;

Fig. 3 a medial vertical section of a speed-change gear train embodying my invention;

Fig. 4 a transverse section on line 4—4 of Fig. 1; and

Figure 5:
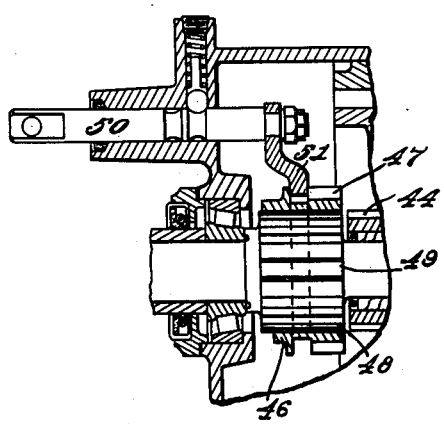

Fig. 5 a section on line 5—5 of Fig. 4.

In the drawings 10 indicates the chassis frame, 11, 11, the rear driven wheels, 12 the rear axle structure, 13, 13 the front power-driven wheels, each swingable about a subtantially vertical axis and controlled by steering means including the usual steering wheel 14. Each of the axles, where all the traction wheels are of the same diameter, embodies power-delivery means including a differential gearing. All of these parts may be of well known form although I prefer that the differential in the front axle be laterally offset to one side of the medial line of the vehicle for a reason which will appear.

The motor 15 will be connected through the usual clutch 16 and primary speed-change gearing 17 to the power-receiving shaft of the mechanism now to be described.

Journalled in housing 20 is the power-receiving shaft 21 connected by universal coupling 22 with the power-delivery shaft 23 of the primary speed-change gearing 17. Alined with shaft 21 is the power-delivery shaft 24 upon the outer end of which is splined the sleeve 25 of a universal coupling 26 which is connected by shaft 27 with the differential of the rear axle.

Shaft 24, at its inner end, is provided with a spur gear 28, and an internal clutch-tooth series 29 adapted to receive the external spur gear 30 splined on shaft 21. Gear 30 is shiftable into and out of clutching relation with shaft 24 and, through a non-active intermediate position, out of and into mesh with a gear 31 carried by counter-shaft 32 journalled in housing 20, gear 31 being of larger diameter than gear 30.

Also carried by shaft 32 and rotating with gear 31 is a gear 33.

Also journalled in housing 20 is the power-delivery shaft 34 which is connected by universal coupling 37 with the shaft 36 which leads to the differential of the front axle.

Journalled on shaft 34 is a gear 35 which meshes with gear 33.

In the present drawings the ratio of gears 28—35 is 1½ to 1 because of the provision of endless track (to be described later) instead of ground wheels of the same size as the driven front-wheels, and it will be readily understood that, if rear ground wheels be provided, gears 28 and 35 will be of equal size.

Between gear 35 and shaft 34 I interpose an overrunning clutching means C which may be any one of a number of acceptable efficient forms so long as it permits shaft 34 to overrun gear 35 when the vehicle is pursuing an arcuate course.

In the present instance I have illustrated an overrunning clutch of the helical spring type wherein the helical spring 40, coaxial with shaft 34, is non-rotatively anchored at one end by collar 41 on a sleeve 42 journalled on shaft 34 with the external periphery of sleeve 42 of such diameter that, upon slight angular movement of the free end of the helix, said helix will become frictionally locked with gear 35. The free end of helix 40 is connected to one end of a lighter helix 40' the external periphery of which is of slightly larger diameter than helix 40.

Sleeve 42 and the compound helix 40—40' are arranged in the bore 35' of the hub of gear 35 and continuous frictional contact of helix 40' with said bore, irrespective of relative rotation of gear 35 and shaft 34 is insured by a collar 43 sleeved within said helix 40' and splined on sleeve 42. With this form of compound helix the external diameter of portion 40 is such that normally, with said portion 40 not expanded, there is little, if any, frictional contact with bore 35'.

At one end, sleeve 42 is provided with an external cylindrical series of clutch teeth 44 overlaid by an internal cylindrical series of clutch teeth 45 carried by gear 35. Splined upon shaft 34 is a clutch ring 46 provided with a cylindrical series of clutch teeth 47 adapted to interlock with teeth 45 and an internal series of clutch teeth 48 interlocking continuously with the splines 49 of shaft 34 and capable of interlocking with teeth 44 either with or without interlocking with teeth 45.

Clutch ring 46 is manually shiftable to any one of its three positions by means of an axially shiftable rod 50 and yoke 51, rod 50 being connected to a suitable shifting lever (not shown) arranged within easy reach of the driver of the vehicle in any well known manner.

Gear 30, which in one position serves as a clutch ring, is manually axially shiftable by means of a rod 52 and yoke 54, rod 52 being connected to a suitable shifting lever (not shown) arranged within easy reach of the driver of the vehicle in any well known manner.

The casing 20 depends from the axis of shafts 21 and 24 at an angle of about 45 degrees (not critical) and, at its lower end, is braced by a cushioned brace 55 anchored on the chassis frame.

The above described mechanism within housing 20 provides a two-speed selective gear ratio between the primary usual speed changing gearing 17 and the front and rear traction means, wherein one speed ratio is obtained when gear 30, as a clutch element, engages teeth 29 and the other speed ratio is obtained when gear 30 is in mesh with gear 31.

In addition, that portion of the mechanism within housing 20 comprising parts 35, 40, 40', 41, 43, 44, 45, 46, 47, 48, 49, whereby shaft 34 is entirely segregated from the motor (ring 46 being in the position shown in Fig. 5); or shaft 34 is connected to the motor through the medium of the overrunning clutch C (ring 46 being in mesh with teeth 44 but not in mesh with teeth 45); or shaft 34 is directly connected to gear 35 and the overrunning clutch C is rendered ineffective (ring 46 being in mesh with teeth 44 and 45), permits the driver to manually determine whether the propeller shaft 36 shall be positively driven in synchronism with propeller shaft 27, or shall be permitted to temporarily overrun shaft 27, or shall be entirely disconnected from the motor though shaft 27 is connected. It will be noted in this connection that any temporary overrunning of shaft 36 relative to shaft 27 resulting from a functioning of the overrunning clutch will be entirely noiseless.

It will be noticed that, in the drawings, the rear driven wheels 12 are not traction wheels, as they well might be without altering the operation of the various parts described above, but are the driving wheels each for an endless traction belt or track 60 engaging therewith and also supported each by an end idler 61 with intermediate idlers 62, 62, 63, 63 interposed between the lower run of the track and the chassis frame.

In the illustrated embodiment of this feature, the two idlers 62, 62 are journalled at opposite ends of a beam 64 pivoted at 65 upon the forward end of an arm 66 pivoted at 67 on bracket 68 depending from the chassis frame. Similarly idlers 63, 63 are journalled on beam 64' pivoted on rearwardly extending arm 66' pivoted at 67'. An equalizer lever 69, pivoted at 70 on bracket 68 overlies arms 66 and 66' to receive the upward thrust of each arm and transmit it as a downward thrust on the companion arm.

In order that the peripheral speed of the traction tracks may be equal to that of the front wheels—in straight line travel—the diameters of the gears 28 and 35 are properly proportioned.

I claim as my invention:

1. A power-transmission unit for motor vehicles, comprising a casing, a shaft journalled therein and projected from one side thereof and adapted for connection to the power-delivery shaft of the power plant, a second shaft aligned with said first shaft journalled in the casing and projected from the opposite side of the casing and adapted for connection with the vehicle propeller shaft, a manually controlled clutch interposed between said aligned shafts, a third shaft journalled in the casing and projected from one side thereof and adapted for connection to a second propeller shaft, a power-transmission train interposed between said first and third shafts and comprising an overrunning clutch, a manually shiftable clutching element interposed between said overrunning clutch and said third shaft and selectively shiftable to segregate said third shaft from the power-transmission train or to connect said third shaft with the power-transmission train through the overrunning clutch, or to connect the power-transmission train with said third shaft independent of said overrunning clutch.

2. Apparatus of the character specified in claim 1 wherein the power-transmission train is of a selective speed type, selectively dependent upon the position of the first-mentioned clutching element.

ARTHUR W. HERRINGTON.